United States Patent
Lang et al.

(10) Patent No.: US 9,707,891 B2
(45) Date of Patent: Jul. 18, 2017

(54) MIRROR REPLACEMENT SYSTEM FOR A VEHICLE

(71) Applicants: Werner Lang, Ergersheim (DE); Manuel Kunz, Roettingen (DE); Peter Geissendoerfer, Ergersheim (DE); Michael Witzke, Ansbach (DE); Michael Hornung, Ergersheim (DE); Stefan Centmayer, Ergersheim (DE)

(72) Inventors: Werner Lang, Ergersheim (DE); Manuel Kunz, Roettingen (DE); Peter Geissendoerfer, Ergersheim (DE); Michael Witzke, Ansbach (DE); Michael Hornung, Ergersheim (DE); Stefan Centmayer, Ergersheim (DE)

(73) Assignee: MEKRA LANG GMBH & CO. KG, Fuerth (DE)

( * ) Notice: Subject to any disclaimer, the term of this patent is extended or adjusted under 35 U.S.C. 154(b) by 628 days.

(21) Appl. No.: 13/956,817

(22) Filed: Aug. 1, 2013

(65) Prior Publication Data
US 2014/0036081 A1   Feb. 6, 2014

(30) Foreign Application Priority Data

Aug. 3, 2012   (DE) .................. 10 2012 015 398

(51) Int. Cl.
*B60R 1/02*   (2006.01)
*B60R 1/06*   (2006.01)
(Continued)

(52) U.S. Cl.
CPC ........ *B60R 1/00* (2013.01); *B60R 2300/8046* (2013.01); *H04N 5/2252* (2013.01)

(58) Field of Classification Search
CPC ..... B60R 11/04; B60R 1/02; B60R 2011/004; B60R 2011/0084; B60R 1/00;
(Continued)

(56) References Cited

U.S. PATENT DOCUMENTS 5,760,828 A * 6/1998 Cortes ................. B60R 1/00
                                                  348/143
5,877,897 A * 3/1999 Schofield ........... H04N 7/183
                                                  348/E7.086
(Continued)

FOREIGN PATENT DOCUMENTS

| CN | 101636297 A | 1/2010 |
| CN | 102823240 A | 12/2012 |

(Continued)

OTHER PUBLICATIONS

Non-final Office Action mailed Jun. 2, 2014 in related U.S. Appl. No. 13/367,985.
(Continued)

*Primary Examiner* — Nathnael Aynalem
(74) *Attorney, Agent, or Firm* — J-Tek Law PLLC; Jeffrey D. Tekanic; Scott T. Wakeman

(57) ABSTRACT

A mirror replacement system for a vehicle includes an image capture unit, a supply unit, and an image reproduction unit. The image reproduction unit is adapted to be disposed in the vehicle interior in a manner viewable by the driver. The image capture unit and the supply unit are disposed in spaces, which are separated from each other and are separately sealed. Further, the image capture unit and the supply unit are each disposed separated from and outside the image reproduction unit.

11 Claims, 2 Drawing Sheets

(51) Int. Cl.
*B60R 1/00* (2006.01)
*H04N 5/225* (2006.01)

(58) Field of Classification Search
CPC ........ B60R 2300/105; B60R 2300/303; B60R 2300/8046; B60R 2300/8066; H04N 5/2252; H04N 5/2253; H04N 5/2257; B60D 1/52
USPC .......................... 224/42.2; 348/148; 396/419
See application file for complete search history.

(56) References Cited

U.S. PATENT DOCUMENTS

| | | | |
|---|---|---|---|
| 6,535,242 B1 * | 3/2003 | Strumolo | B60R 11/04 348/148 |
| 6,693,524 B1 | 2/2004 | Payne | |
| 7,079,017 B2 | 7/2006 | Lang et al. | |
| 7,454,128 B2 | 11/2008 | Lang et al. | |
| 7,574,287 B2 | 8/2009 | Lang et al. | |
| 7,697,055 B2 | 4/2010 | Imoto et al. | |
| 7,825,951 B2 | 11/2010 | Lang et al. | |
| 8,624,716 B2 | 1/2014 | Englander | |
| 8,953,011 B2 | 2/2015 | Lang et al. | |
| 2001/0052845 A1 | 12/2001 | Weis et al. | |
| 2002/0003571 A1 * | 1/2002 | Schofield | B60C 23/00 348/148 |
| 2002/0159774 A1 * | 10/2002 | Koyama | H04N 5/2251 396/505 |
| 2002/0163589 A1 | 11/2002 | Yukawa et al. | |
| 2003/0085999 A1 | 5/2003 | Okamoto et al. | |
| 2003/0122930 A1 | 7/2003 | Schofield | |
| 2003/0214733 A1 * | 11/2003 | Fujikawa | B60R 1/00 359/838 |
| 2003/0320911 | 11/2003 | Hatanaka | |
| 2004/0004541 A1 | 1/2004 | Hong | |
| 2004/0036768 A1 | 2/2004 | Green | |
| 2004/0169762 A1 | 9/2004 | Imoto | |
| 2004/0201700 A1 * | 10/2004 | Ho | H04N 5/2251 348/207.99 |
| 2004/0223074 A1 | 11/2004 | Takada | |
| 2004/0230358 A1 * | 11/2004 | Stam | B60Q 1/1423 701/49 |
| 2004/0325603 | 11/2004 | Takada | |
| 2005/0083405 A1 | 4/2005 | Imoto et al. | |
| 2005/0083427 A1 | 4/2005 | Imoto | |
| 2006/0098094 A1 * | 5/2006 | Lott | B60R 1/00 348/148 |
| 2006/0171704 A1 * | 8/2006 | Bingle | B60R 11/04 396/419 |
| 2006/0215020 A1 | 9/2006 | Mori et al. | |
| 2006/0251502 A1 | 11/2006 | Scharfenberger | |
| 2006/0285475 A1 * | 12/2006 | Ishibashi | H01S 5/024 369/122 |
| 2007/0209436 A1 | 9/2007 | Akita et al. | |
| 2007/0216770 A1 * | 9/2007 | Chang | B60Q 1/0023 348/148 |
| 2007/0320359 | 12/2007 | Sakai | |
| 2008/0122597 A1 | 5/2008 | Englander | |
| 2008/0151048 A1 | 6/2008 | Watanabe et al. | |
| 2008/0180351 A1 | 7/2008 | He | |
| 2008/0203308 A1 * | 8/2008 | Yoo | B60R 1/00 250/352 |
| 2008/0246843 A1 | 10/2008 | Nagata et al. | |
| 2008/0276191 A1 | 11/2008 | Breed | |
| 2009/0146051 A1 | 6/2009 | Ishikawa | |
| 2009/0213037 A1 | 8/2009 | Schon | |
| 2009/0290369 A1 | 11/2009 | Schofield et al. | |
| 2010/0091379 A1 | 4/2010 | Lang et al. | |
| 2010/0110189 A1 | 5/2010 | Kuboyama et al. | |
| 2010/0117815 A1 | 5/2010 | Deline et al. | |
| 2010/0238288 A1 | 9/2010 | Klaerner et al. | |
| 2011/0080277 A1 | 4/2011 | Traylor et al. | |
| 2011/0115913 A1 | 5/2011 | Lang et al. | |
| 2011/0317049 A1 | 12/2011 | Kurane | |
| 2012/0013742 A1 | 1/2012 | Fairchild et al. | |
| 2012/0069184 A1 | 3/2012 | Hottmann | |
| 2012/0154591 A1 | 6/2012 | Baur et al. | |
| 2012/0200664 A1 | 8/2012 | Lang et al. | |
| 2013/0038735 A1 | 2/2013 | Nishiguchi et al. | |
| 2013/0314539 A1 | 11/2013 | Lang et al. | |
| 2014/0036081 A1 | 2/2014 | Lang et al. | |
| 2014/0058653 A1 | 2/2014 | Schofield et al. | |

FOREIGN PATENT DOCUMENTS

| | | |
|---|---|---|
| DE | 19539642 A | 11/1996 |
| DE | 69509040 | 12/1999 |
| DE | 19900498 A | 7/2000 |
| DE | 10043099 A1 | 3/2002 |
| DE | 10356144 A1 | 6/2004 |
| DE | 10254035 | 8/2004 |
| DE | 10 2005 028 144 A1 | 12/2006 |
| DE | 102006020511 A | 11/2007 |
| DE | 102004043257 | 2/2009 |
| DE | 102008034606 A1 | 1/2010 |
| DE | 202011005102 U1 | 7/2011 |
| DE | 102011010624 A1 | 8/2012 |
| EP | 1018839 A2 | 7/2000 |
| EP | 1705623 A | 9/2006 |
| EP | 2555518 A | 2/2013 |
| GB | 2351055 A | 12/2000 |
| JP | H0396938 U | 10/1991 |
| JP | H0471939 A | 3/1992 |
| JP | H0675932 U | 10/1994 |
| JP | H0884277 A | 3/1996 |
| JP | 2001114048 A | 4/2001 |
| JP | 2002022463 A | 1/2002 |
| JP | 2002109697 A | 4/2002 |
| JP | 2002325191 A | 11/2002 |
| JP | 2003219226 A | 7/2003 |
| JP | 2003327048 A | 11/2003 |
| JP | 2007091186 A | 4/2007 |
| JP | 2007110572 A | 4/2007 |
| JP | 2007112368 A | 5/2007 |
| JP | 2007282098 A | 10/2007 |
| JP | 2008054030 A | 3/2008 |
| JP | 2008149764 A | 7/2008 |
| JP | 2009141844 A | 6/2009 |
| JP | 2011095321 A | 5/2011 |
| JP | 2011193485 A | 9/2011 |
| JP | 2012178150 A | 9/2012 |
| KR | 1020100089362 A | 8/2010 |
| WO | 2011061238 A1 | 5/2011 |

OTHER PUBLICATIONS

Office Action from the Japanese Patent Office dated Sep. 8, 2015 in counterpart Japanese application No. 2014-116130, and partial translation thereof.

Office Action / Decision to Refuse from Japanese Patent Office in related application dated Feb. 4, 2014, and English translation thereof.

European Examination Report dated Nov. 26, 2013, for application EP 13 174 694.3 (and machine partial translation).

English translation of Office Action from corresponding Japanese application No. 2013-161460 dated Oct. 1, 2013.

* cited by examiner

MIRROR REPLACEMENT SYSTEM FOR A VEHICLE

CROSS-REFERENCE

This application claims priority to German patent application no. 10 2012 015 398.8 filed on Aug. 3, 2012, the contents of which are fully incorporated herein by reference.

TECHNICAL FIELD

The present invention relates to a mirror replacement system for a vehicle, in particular for a commercial vehicle.

BACKGROUND

In motor vehicles, so-called fields of view are legally-prescribed based on the type of motor vehicle, for example, motorcycles, motor vehicles for transporting passengers, motor vehicles for transporting goods, etc. The fields of view must be provided by a device for indirect viewing, conventionally a mirror, and must be viewable at all times by the driver sitting in the driver's seat using the device for indirect viewing. Depending on the type of vehicle and, in particular, on which areas around the vehicle can be directly viewed by the driver, different legal provisions require that certain fields of view are permanently and reliably viewable at all times using the devices for indirect viewing.

Therefore, for commercial vehicles, such as, for example, trucks or delivery vehicles, a device such as a primary mirror is currently provided on each of the driver's side and the passenger's side as a device for indirect viewing. By using the primary mirror, the vehicle driver can see a level and horizontal part of the road surface of a certain width that extends from a stipulated distance behind the vehicle driver's eye points up to the horizon. In addition, a band of lesser width must be viewable for the vehicle driver using this mirror, which band begins at a short distance behind the driver's eye points. Such legally-prescribed areas, which must be viewable permanently and at all times by the driver with the use of the devices for indirect viewing, will be designated as fields of view.

In recent times, it is becoming increasingly common to consider using, in addition to conventional mirrors as devices for indirect viewing, camera systems as devices for indirect viewing either in addition to or as a replacement for the mirrors. In such camera systems, an image sensor device continuously captures (detects and stores) an image. The (video-)data captured by the image capture unit are transmitted, e.g., using a supply unit and optionally after further processing, to a display device located in the driver's cabin. The display device depicts the corresponding legally-required field of view or a plurality of fields of view and optionally supplemental information, such as e.g., possible collision risks, distances to other objects, etc., for the area around the vehicle in manner that is permanent and viewable at all times for the driver.

Currently, such mirror replacement systems based upon camera usage are primarily utilized for passenger vehicles and in particular for the reverse-driving area. In these systems, the image capture unit is connected directly with the body of the vehicle substantially without any spacing or separation therefrom. The information obtained by the camera usage is transmitted in most cases supplementally to the conventionally-used mirrors.

A camera assembly having an image sensor sealed against environmental influences is known from DE 10 2005 028 144 A1. The camera assembly includes an outer housing and an image sensor attached to an electronic support, and the outer housing includes an optical segment having at least one imaging optic disposed in the optical segment. The optical segment is sealed in a media-tight manner relative to the electronic support, and a media-tight sensor space that accommodates the image sensor is formed.

A rearview camera for a vehicle is known from US 2004/0036768 A1, which includes a camera body and a lens. The camera body is attached to a mounting base, which retains the camera. The mounting base can be adapted such that it is mountable externally or internally on the vehicle, and a mounting angle of the mounting base points in the direction downward. A seal can be used in order to seal the camera relative to the rear wall of the vehicle.

A rearview device for vehicles is known from DE 695 09 040 T2, which includes a micro-camera and a control unit for the micro-camera. The micro-camera and the control unit are respectively provided in separated housings. The control unit performs the function of the power supply of the micro-camera and transmits the last-generated signal to the monitor.

When camera systems are to be used as mirror replacements, strict legal requirements can be expected. These requirements apply not only to the permanent and viewable-at-all-times depiction, but also to the image quality and resolution with which the images must be depicted on the display device in the driver's cabin. This helps ensure that the images are observable to the human eye in a manner corresponding to the depictions in a mirror and, as much as possible, do not confuse the driver. In particular, for the replacement of wide-angle mirrors, it is an additional challenge to ensure that a sufficient aperture angle of the image is depicted, while at the same time that the entire area, which is viewable by the wide-angle mirror in a conventional manner, and the corresponding associated field of view are depicted. On the other hand, for the replacement of a primary mirror, it is essential to ensure a sufficiently high resolution of the image. It is difficult to realize these requirements with conventional systems in which the image capture unit and a control unit/supply unit associated therewith are disposed in a manner separated from each other. For example, in some such systems, the control unit/supply unit is disposed in the vehicle interior and the image capture unit is disposed outside of the vehicle, generally speaking on the vehicle body, due to the large amount of data to be transmitted for providing a sufficient image resolution. In the alternative, the supply unit and the image capture unit have been consolidated in a single sealed housing, which is mounted on the outer portion of the vehicle, and thus must ensure the highest-possible sealing requirements for the image capture unit as well as the supply unit, in particular with regard to the image capture unit.

SUMMARY

In one aspect of the present teachings, a mirror replacement system for a vehicle is disclosed, which can serve as mirror replacement system, for example, for primary mirrors and wide-angle mirrors of a commercial vehicle with respect to the resolution of the data and the insight into the legally-prescribed fields of view, and at the same time is easily constructed and producible in a cost-effective manner.

In another aspect of the present teachings, a mirror replacement system for a vehicle contains a supply unit and an image reproduction (display) unit in addition to an image capture unit (in the alternative, image acquisition unit or image detecting/storing unit). Because the image capture unit and the supply unit are disposed in spaces that are separated from each other and are separately sealed, it is possible to reduce the amount of data that must be transmitted to the image reproduction unit, i.e. in particular the amount of data that must be transmitted from an area outside of the body of the vehicle into the interior of the vehicle. This may be accomplished by disposing the supply unit close to the image capture unit, preferably outside of the body of the vehicle. Because separately sealed spaces are provided for the image capture unit and the supply unit, it is possible to house only the image capture unit in one space and/or housing, which satisfies the strictest sealing requirements, namely with respect to water-vapor-tightness. On the other hand, the supply unit can be housed in a different space and/or housing having lesser sealing requirements, e.g., which only satisfies the sealing requirements that are sufficient for the operational protection of the electrical components contained in the supply unit. By reducing the sealing requirements for the housing and/or the space of the supply unit, it is thus possible to use plastic or other light constructive materials, such as e.g. coated plastics, instead of metals, which leads to weight- and cost-savings for the assembly as a whole.

Moreover, mirror replacement systems according to the present teachings can be advantageously housed in spaces that are spaced relatively far from the body of the vehicle, such as, for example, in or on a camera arm that extends laterally-outwardly from the vehicle body. In this case, due to the advantageous design of, in particular, the image capture unit and the supply unit and their housings, it is not necessary to transmit a large amount of data over long distances into the interior of the vehicle for the image reproduction unit, and these assemblies can be advantageously housed, for example, in the camera arm. If it is possible to use such a camera arm, it becomes possible to capture legally-prescribed fields of view of the primary mirrors and wide-angle mirrors (field of view II and field of view IV, respectively) by using the image capture unit. In particular, when using a digital image sensor (a complementary metal oxide semiconductor (CMOS) or a charge coupled device (CCD) or other conventional image sensor, for example) it becomes possible to depict the images on the image reproduction unit in the interior of the vehicle with sufficiently high resolution. That is, since the image capture unit is spaced far enough away from the vehicle side wall and/or the vehicle body, a less extreme wide-angle device can be used as the image capture device than would be the case if the image capture unit were directly attached to the body. As a result, on one hand, data transmission to the image reproduction unit, e.g., to an image display or a projection onto body parts in the interior of the vehicle, is simplified since only a reduced amount of data must be transmitted over a long distance. Thus, strict demands on cables, electrical connectors and electronic components for the data transmission are required only over relatively short distances. On the other hand, this makes possible the usage of a digital camera system and thus the depiction of the legally-prescribed fields of view with sufficiently high resolution and makes possible a relatively freely-selectable position on the vehicle, on which the image capture unit is attached.

According to a preferred embodiment, the supply unit or the image capture unit or both the supply unit and the image capture unit is/are adapted to carry out a reduction of the amount of data to be transmitted. This may be accomplished by performing, e.g., video processing for image resizing, in which areas outside the areas requiring depiction by the image capture unit are cropped, and/or wherein the amount of data is compressed using conventional compression methods and the like. Thus, the amount of video data to be transmitted to the image reproduction unit can be reduced near its point of origin, which in turn reduces the requirements for transmitting the data.

According to another preferred embodiment, the supply unit and/or the image capture unit is/are further adapted to perform additional video editing and processing. This processing may include, for example, an image analysis for assisting the driver, an image arrangement/compilation of the depiction to be reproduced on the image reproduction unit in the vehicle interior, white balancing and/or combinations thereof. This processing in turn leads to the need to transmit only the data which will actually be depicted on the image reproduction unit from an area outside of the vehicle into the area inside of the vehicle, if the image capture unit and the supply unit are disposed in separated housings, but outside of the vehicle. Moreover, the image capture unit and/or the supply unit can be adapted or configured to perform additional video processing, such as, for example, a self-recognition of contamination, optionally with an initiation of a cleaning process by an appropriate controller and the like.

According to a preferred embodiment, the image capture unit and the supply unit are disposed in direct proximity to each other, for example, in or on a common camera arm and/or camera housing. The directly-proximity arrangement of the image capture unit and the supply unit reduces the distance over which large amounts of data must be transmitted, which in turn leads to reduced requirements with respect to the electronic components, such as cables, connectors, etc.

It is further preferred to dispose the supply unit and the image capture unit in a common housing, which however merely serves to form an assembly and is not crucial with respect to sealing, since the image capture unit as well as the supply unit are each respectively housed in cases or housings that have been sealed according to the corresponding requirements. For example, such a common housing can be a camera arm or a camera housing.

According to a preferred embodiment, the image capture unit is disposed in a water-vapor-tight or hermetically-sealed housing, preferably in a metallic housing. In this case, the strict sealing requirements for the housing of the image capture unit can be fulfilled. At the same time, it is not necessary to also seal the supply unit in a correspondingly tight manner, and thus a relatively light plastic housing preferably can be used as the housing for the supply unit, which leads to a weight- and cost-savings as compared to a metallic housing. Due to the combination of a metallic housing for the image capture unit and a plastic housing for the supply unit, a cost savings and a weight savings are thus possible without losses with respect to the required sealing-tightness.

According to a preferred embodiment, one or a plurality of image capture units is/are provided. In particular, it is conceivable, for example, that one image capture unit is provided for capturing the image corresponding to a primary mirror (field of view II) and one image capture unit is provided for capturing an image corresponding to a wide-angle mirror (field of view IV). These image capture units are preferably connected with a common supply unit or in the alternative thereto with a plurality of individual supply units respectively associated with the respective image capture units. Preferably, when a plurality of image capture units are used, they are coupled with a common supply unit that controls the image capture units and carries out the video processing of the captured data. Therefore, for example, the data from the different image capture units can be compiled/arranged already in the supply unit into a common image or common depiction to be reproduced on the image reproduction unit. The plurality of image capture units can be formed in the same manner and e.g., can be only differently oriented and thus different viewing areas can be captured, or image capture units that are different from one another can be provided if necessary, e.g. which differ as to the aperture angle or the resolution thereof.

It is also possible to provide a plurality of supply units for one or more image capture units. In this case, these supply units are preferably disposed such that they serve to duplicate the function of each other (i.e. provide redundancy), which has the effect of increasing the operational reliability of the system. The supply unit preferably serves to control the one or more image capture units, as well as to provide a current supply, etc., and receives the data from the one or more image capture units, processes the data and transmits the data to the image reproduction unit, e.g. an image display or a projector, in the vehicle interior.

If the supply unit and the image capture unit are integrated into a common housing, such as for example into a camera housing or a camera arm, it is thus also possible to integrate into this common housing additional functional components, such as for example any one or any arbitrary combination of two or more of blinker(s), antenna(e), sensor(s), such as for example a temperature sensor and/or a distance sensor, an anti-theft device, a video-recording device (black box), a cleaning device for the optical elements, etc. These functional components could be selectively controlled by the supply unit or by other control components in the vehicle.

According to a preferred embodiment, a heating element is integrated into the image capture unit, which heating element is also preferably controlled by the supply unit. In this case, the supply unit is preferably coupled with a temperature sensor or sensing means and/or with a vehicle control element, which outputs a control signal to the supply unit in accordance with the outside temperature that causes the optical elements of the image capture unit, in particular, for example, a lens glass or front glass (protective transparent shield), to be heated. In the alternative, the heater can also be coupled, for example to vehicle control elements, such as a vehicle heater, a remote control of a locking system of a vehicle, the central locking system or other control elements for vehicle signals.

According to a preferred embodiment, the vehicle functional components, the supply unit and the image capture unit are disposed in a common housing.

According to a preferred embodiment, a mirror replacement system for a vehicle includes a common housing, an image capture unit sealed in an image capture unit case in the common housing, and a supply unit sealed in a supply unit case. The supply unit case is located inside the common housing and outside the image capture unit case, and the supply unit is configured to communicate with an image reproduction unit outside the common housing and in the vehicle interior in a location viewable by a driver. Furthermore, the supply unit is configured to compress images captured by the image capture unit and to transmit the compressed images to the image reproduction unit.

BRIEF DESCRIPTION OF THE DRAWINGS

In the following, the invention will be described in an exemplary manner with the assistance of the appended Figures, in which.

DETAILED DESCRIPTION OF THE INVENTION

Figure 1:
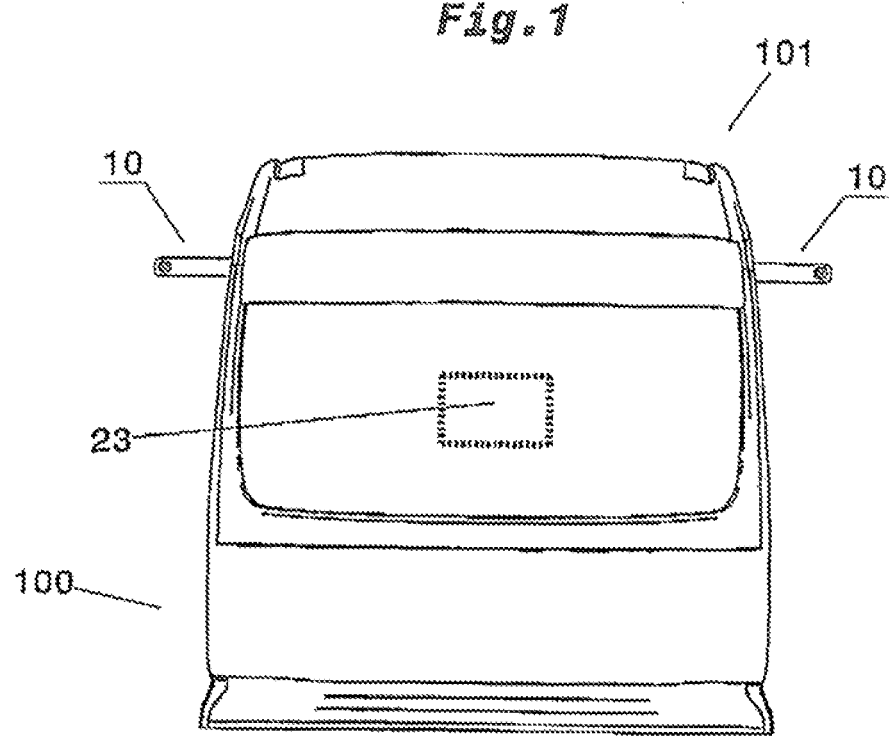
FIG. 1 shows in a perspective view the operator's cabin of a commercial vehicle, as observed in a viewing direction from the rear towards the front, wherein the operator's cabin supports a camera arm having an inventive mirror replacement system.
Figure 2:
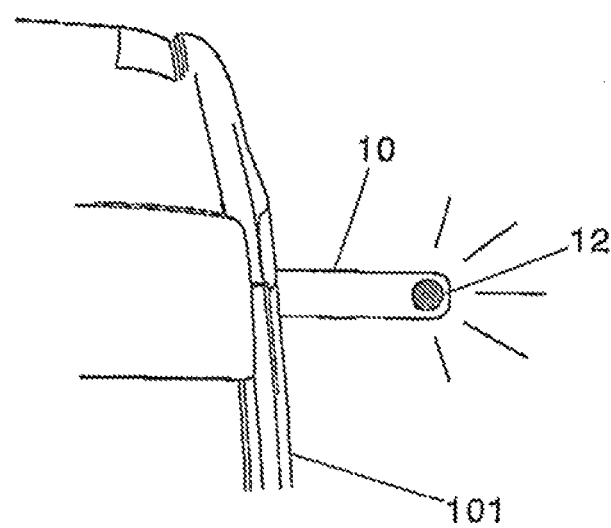
FIG. 2 is an enlarged depiction of a partial area of FIG. 1.

FIG. 1 shows a driver's cabin 101 of a commercial vehicle 100 in a perspective view with a viewing direction from the rear towards the front. A camera arm 10 is provided on the driver's cabin 101 on the right side and on the left side, respectively, which camera arm 10 projects laterally towards the outside. Instead of the camera arm 10, in principle, any type of camera or camera housing can also be used, i.e. of course components are also conceivable that are not disposed a significant distance to the vehicle 100, in particular to its outer wall, like the camera arm 10.

The camera arm 10 forms a common housing 11 (see FIG. 3), in which at least one image capture unit 12, 12' and at least one supply unit 14, 14' are accommodated.

Figure 3:
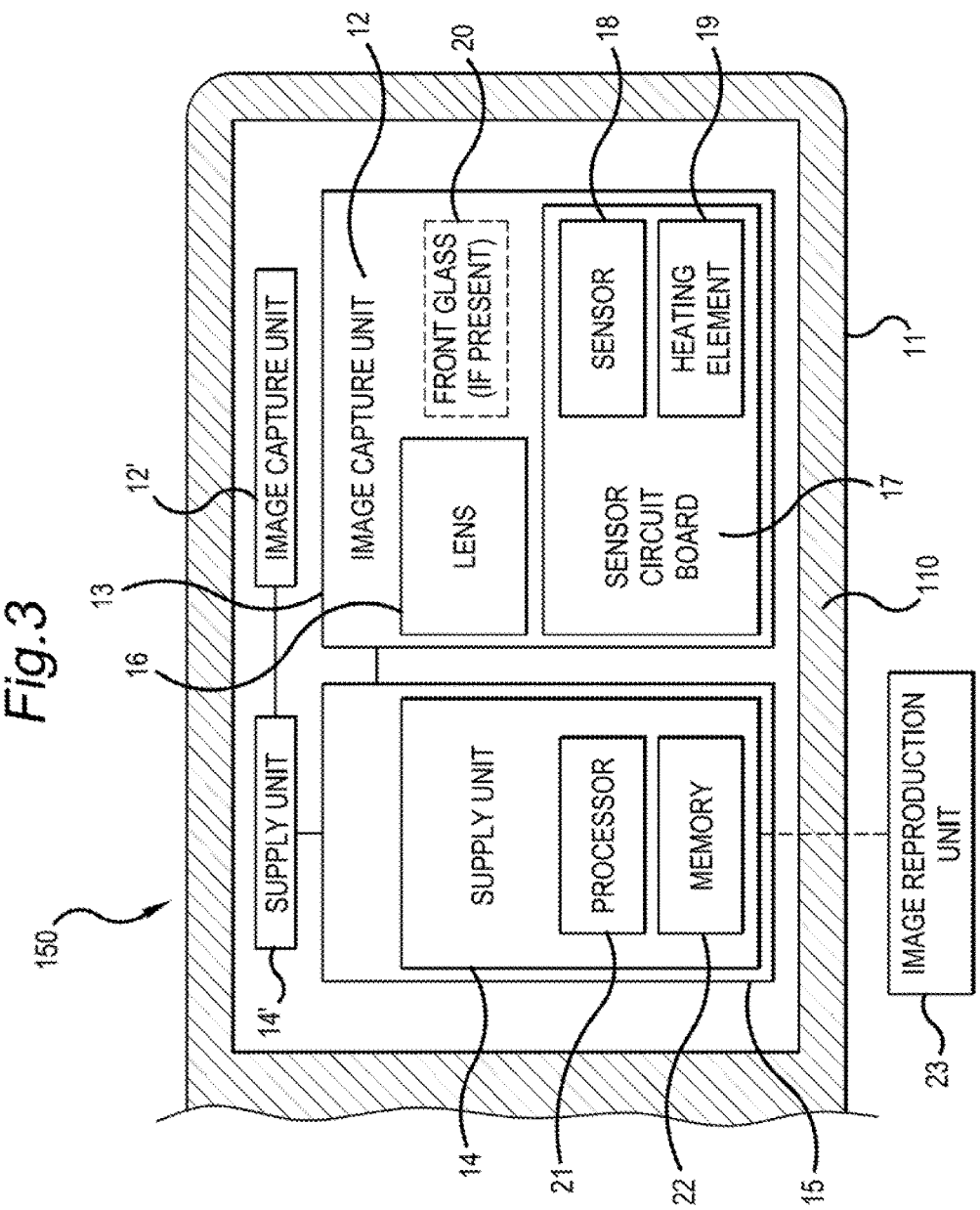
FIG. 3 schematically shows the inventive mirror replacement system.

As is recognizable in FIG. 3, the image capture unit 12 and the supply unit 14, which serves to control and supply power to the image capture unit 12, are disposed in spaces and/or housings 13, 15, which are separated from each other, but which are both integrated into the camera housing 11 and are disposed outside of, in particular, the image reproduction unit 23 depicted in FIG. 1; the image reproduction unit 23 is positioned inside the driver's cabin 101 and is viewable by the driver at all times.

The housing 13 of the image capture unit is a metallic housing that satisfies the strictest requirements with respect to sealing, such as in particular water-vapor-tightness, so that the optical components disposed in the housing 13 of the image capture unit 12, such as a lens 16 and e.g. a sensor circuit board 17 having a sensor 18 and a heating element 19, are reliably protected against water vapor and other contaminants and/or moisture. When a front glass 20 for the lens 16 is provided as depicted in FIG. 3, it is of course integrated into the metallic housing 13 of the image capture unit 12 such that the sealing requirements with respect to the housing 13 are likewise fulfilled.

The supply unit 14 for the image capture unit 12 can be housed in a plastic housing 15 or in another lightweight housing.

The supply unit 14 is coupled with the image capture unit 12 as well as with the image reproduction unit in the vehicle interior and, on the one hand, supplies the image capture unit 12 with control signals. On the other hand, it receives the captured data and video images from the image capture unit 12, which are processed by a processor 21 (for example, a FPGA or a DSP) having a memory 22 in the supply unit 14, in particular to reduce the amount of data, but also for the preparation of the depiction on the image reproduction unit. In particular, in addition to the reduction of the amount of data, the supply unit also performs a data processing such that, e.g., an image resizing takes place. Image processing for data compression and/or cropping and/or transformation may be accomplished using various software programs and/or algorithms that are well known in the art such as, without limitation, MPEG-2, MPEG-4, Theora, Dirac and RealVideo®. The processor 21 may also perform an image analysis for assisting the driver so that the driver is made aware of dangers or the like by using color codes or acoustic signals.

In the embodiment depicted in FIG. 3, the heating element 19 integrated in the image capture unit 12 is controlled by a sensor 18, e.g., a temperature sensor, which is also integrated in the image capture unit 12. When the sensor 18 detects a predetermined low temperature, the heating element 19 is energized such that it heats the front glass 20 and/or the lens 16. Instead of disposing the sensor 18 in the image capture unit 12, in the alternative the sensor 18 could be also be disposed in the common housing 11 of the supply unit 14 and the image capture unit 12 or outside thereof. Instead of the temperature sensor 18, the heating element 19 could also be controlled in accordance with other conditions detected by other sensors, such as e.g. in accordance with data from sensors, which detect the operation of the vehicle heater, which detect the actuation of a central locking system and the like.

Because the supply unit 14 performs an essential video processing of the video image captured by the image capture unit 12, less data is transmitted by the supply unit 14 to the image reproduction unit 23 in the driver's cabin 101 in comparison to the transmission between the image capture unit 12 and the supply unit 14, which however takes place only over short distances. It is therefore possible to also dispose the image capture unit 12 and the supply unit 14 clearly outside of the vehicle, such as e.g. in a laterally-protruding camera arm 10. Because separated housings are provided in view of the sealing requirements for the image capture unit 12 and the supply unit 14, this is possible however without noticeably increasing the weight of the assembly and thus without increasing the costs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved mirror replacement systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Camera arm
11 Housing
12, 12' Image capture unit
13 Housing
14, 14' Supply unit
15 Housing
16 Lens
17 Sensor circuit board
18 Vehicle control element (sensor)
19 Heating element
20 Front glass for lens
21 Processor
22 Memory
23 Image reproduction unit
100 Commercial vehicle
101 Vehicle cabin
150 Mirror replacement system

What is claimed is:

1. A mirror replacement system for a vehicle comprising:
a common housing that forms a camera arm which is provided on a left and/or right side of a driver's cabin, outside the vehicle,
an image capture unit sealed in a water-vapor-tight image capture unit case in the common housing, and
a supply unit sealed in a supply unit case, the supply unit case being located inside the common housing and outside the image capture unit case, the supply unit case being less tightly sealed against an entry of water vapor than the image capture unit case,
wherein the supply unit is configured to communicate with an image reproduction unit outside the common housing and in the vehicle interior in a location viewable by a driver of the vehicle,
wherein the supply unit is configured to compress images captured by the image capture unit and to transmit the compressed images to the image reproduction unit, and
wherein a heating element is integrated into the image capture unit, the heating element being controlled by the supply unit and being coupled to temperature detecting elements or being coupled to vehicle control elements or being coupled to temperature detecting elements and to vehicle control elements.

2. The mirror replacement system according to claim 1, wherein the supply unit is configured to perform at least one process selected from the group consisting of: video processing for image resizing, image analysis for assisting the driver, image arrangement, image compiling, white balancing, self-recognition of contamination, and overlays.

3. The mirror replacement system according to claim 1, wherein the image capture unit is disposed in a metallic housing.

4. The mirror replacement system according to claim 3, wherein the supply unit is disposed in a plastic housing.

5. The mirror replacement system according to claim 1, including at least one additional image capture unit.

6. The mirror replacement system according to claim 1, including at least one additional supply unit.

7. The mirror replacement system according to claim 1, wherein the supply unit is coupled to vehicle functional components of the vehicle.

8. The mirror replacement system according to claim 7, wherein the vehicle functional components of the vehicle, the supply unit and the image capture unit are disposed in the common housing.

9. The mirror replacement system according to claim 1, wherein the supply unit is coupled to the image reproduction unit and is configured to transmit video data, which has been processed by the supply unit and/or by the image capture unit, to the image reproduction unit.

10. The mirror replacement system according to claim 1, wherein the image capture unit is a digital image sensor.

11. The mirror replacement system according to claim 1, wherein the image capture unit comprises a primary mirror replacement image capture unit and further including a wide angle mirror replacement image capture unit and wherein the image capture unit and/or the supply unit is configured to perform an image analysis for assisting the driver, self-recognition of contamination and white balancing.

* * * * *